United States Patent
Hu

(10) Patent No.: US 12,078,254 B2
(45) Date of Patent: Sep. 3, 2024

(54) CONTROL VALVE

(71) Applicant: HANGZHOU AO KE MEI RUI TECHNOLOGY CO., LTD., Zhejiang (CN)

(72) Inventor: Meiyan Hu, Zhejiang (CN)

(73) Assignee: HANGZHOU AO KE MEI RUI TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/026,590

(22) PCT Filed: Sep. 26, 2021

(86) PCT No.: PCT/CN2021/120576
§ 371 (c)(1),
(2) Date: Mar. 15, 2023

(87) PCT Pub. No.: WO2022/151760
PCT Pub. Date: Jul. 21, 2022

(65) Prior Publication Data
US 2023/0332696 A1     Oct. 19, 2023

(30) Foreign Application Priority Data
Jan. 18, 2021   (CN) .......................... 202110065261.1

(51) Int. Cl.
*F16K 5/04*     (2006.01)
*F16K 11/08*    (2006.01)
(Continued)

(52) U.S. Cl.
CPC ........ *F16K 11/0856* (2013.01); *F16K 5/0407* (2013.01); *F16K 5/0471* (2013.01);
(Continued)

(58) Field of Classification Search
CPC .. F16K 11/0856; F16K 5/0407; F16K 5/0471; F16K 11/085; F16K 11/0853; F16K 27/065
See application file for complete search history.

(56) References Cited

U.S. PATENT DOCUMENTS

| | | | |
|---|---|---|---|
| 3,658,093 A | | 4/1972 | Kirkwood |
| 2002/0079003 A1* | | 6/2002 | Scampini .............. F16K 5/0407 137/625.32 |

(Continued)

FOREIGN PATENT DOCUMENTS

| | | |
|---|---|---|
| CN | 103742675 A | 4/2014 |
| CN | 104806779 A | 7/2015 |

(Continued)

OTHER PUBLICATIONS

International Search Report for PCT/CN2021/120576 mailed Nov. 30, 2021, ISA/CN.

*Primary Examiner* — Kevin R Barss
(74) *Attorney, Agent, or Firm* — Yue (Robert) Xu; Apex Attorneys at Law, LLP

(57) ABSTRACT

Discloses is a control valve, comprising a sealing component. The sealing component is located between a side wall portion and a valve core component the sealing component comprises an elastic pad and a sealing member that are integrally formed; the elastic pad comprises a peripheral wall portion and protrusion portions; the elastic pad is provided with multiple first through holes and first grooves; the protrusion portions protrude from the peripheral wall portion; the first grooves are recessed in the peripheral wall portion; the protrusion portions surround the first through holes; the protrusion portions abut against the side wall portion; a valve body component is provided with ribs protruding from the side wall portion, and the ribs extend into the first grooves.

17 Claims, 4 Drawing Sheets

(51) Int. Cl.
*F16K 11/085* (2006.01)
*F16K 27/06* (2006.01)
(52) U.S. Cl.
CPC ........ *F16K 11/085* (2013.01); *F16K 11/0853* (2013.01); *F16K 27/065* (2013.01)

(56) References Cited

U.S. PATENT DOCUMENTS

| | | | | |
|---|---|---|---|---|
| 2018/0372235 | A1* | 12/2018 | Smith | F16K 11/0853 |
| 2019/0136989 | A1* | 5/2019 | Suzuki | F16K 11/0876 |
| 2019/0249787 | A1* | 8/2019 | Whitaker | F16K 11/076 |

FOREIGN PATENT DOCUMENTS

| | | |
|---|---|---|
| CN | 204647386 U | 9/2015 |
| CN | 206175729 U | 5/2017 |
| CN | 111828687 A | 10/2020 |
| CN | 111981164 A | 11/2020 |

* cited by examiner

CONTROL VALVE

This disclosure is a national phase application of PCT international patent application PCT/CN2021/120576, filed on Sep. 26, 2021 which claims the priority to Chinese Patent Application No. 202110065261.1, titled "VALVE DEVICE", filed with the China National Intellectual Property Administration on Jan. 18, 2021, the entire disclosure of which isare incorporated herein by reference.

FIELD

The present disclosure relates to the technical field of fluid control, and in particular to a fluid control valve.

BACKGROUND

Some systems need to use multi-flow passage control valves to control a flow path. For example, a motor vehicle may generally have multiple control valves in order to conduct controlling at present. In a multi-flow passage control valve, a sealing member and an elastic pad with separate structures are used for realizing sealing and sliding-fit with a valve core.

SUMMARY

In order to provide a control valve with a high sealing reliability, the following technical solution is provided according to the present disclosure:

a control valve includes a valve body component and a valve core component, the control valve has a valve cavity, at least most of the valve core component is located in the valve cavity; the valve body component includes a side wall portion, the side wall portion is a peripheral wall or is at least a part of the peripheral wall of the valve cavity, the valve body component is provided with communication holes, the control valve further includes a sealing component, the sealing component is located between the side wall portion and the valve core component, the sealing component includes an elastic pad and a sealing member, the elastic pad and the sealing member are in an integral structure, the elastic pad is located between the sealing member and the side wall portion of the valve body component, the elastic pad includes an outer peripheral wall portion and protruding portions, the elastic pad has multiple first through holes and first recessed grooves, the protruding portions protrude from the outer peripheral wall portion, the first through holes extend through the outer peripheral wall portion, the first recessed grooves are recessed in the outer peripheral wall portion, the protruding portions surround the first through holes, the protruding portions abut against the side wall portion, the valve body component has protruding ribs which protrude from the side wall portion, and the protruding ribs are inserted into the first recessed grooves.

In this case, the sealing component of the control valve includes the elastic pad and the sealing member which are in the integral structure, and the first recessed grooves of the elastic pad are fitted with the protruding ribs of the valve body component, so that the sealing component is located in the valve cavity, which prevents the sealing component from moving when the valve core component rotates; the protruding portions of the elastic pad surround the first through holes, and the protrusion portions abut against the side wall portion, which can improve the sealing reliability between the elastic pad and the side wall portion.

DETAILED DESCRIPTION OF THE EMBODIMENTS

Figure 1:
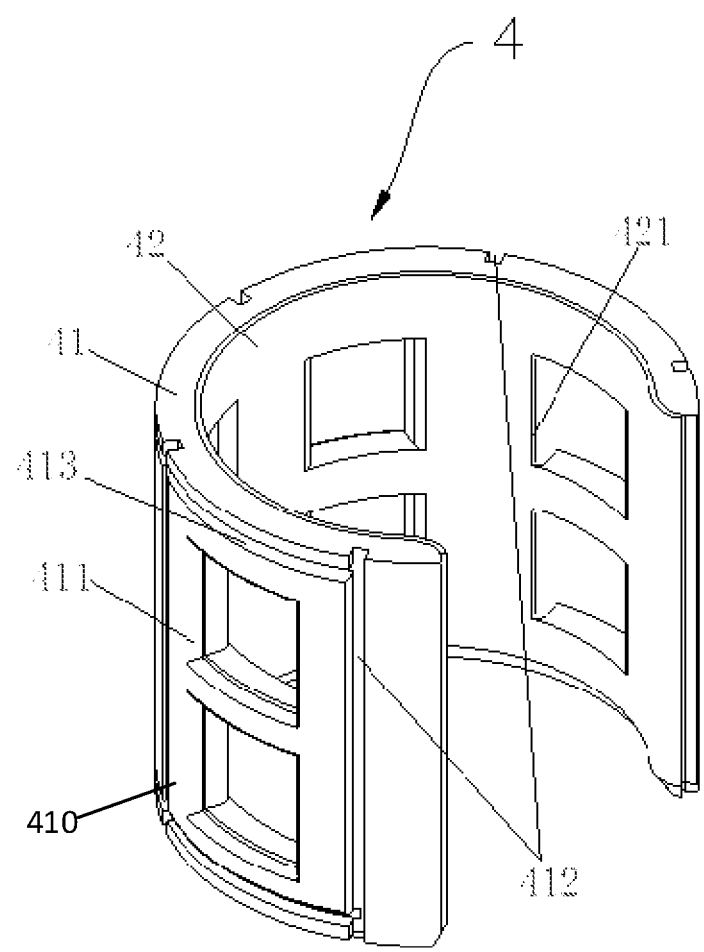
FIG. 1 is a schematic perspective view of a sealing component of a control valve according to an embodiment.

The technical solution of the specific embodiments is described below in conjunction with the accompanying drawings. As shown in FIGS. 1 to 4, a control valve includes a valve body component 10 and a sealing component 4, and further includes a valve core component (not shown). The control valve further has a valve cavity, at least most of the valve core component is located in the valve cavity, and the valve core component is driven to be rotatable. The sealing component 4 includes an elastic pad 41 and a sealing member 42, the elastic pad 41 and the sealing member 42 are fixed by adhesion, etc. The valve body component 10 includes a side wall portion 12 and a bottom wall portion 11, the side wall portion 12 and the bottom wall portion 11 can be integrally formed. The side wall portion 12 is a peripheral wall or at least a part of the peripheral wall of the valve cavity, and the side wall portion 12 protrudes from the bottom wall portion 11. The valve body component 10 has communication holes, the number of the communication holes may be plural, for example, five communication holes may be provided. Alternatively, the number of the communication holes may be greater than or less than five. The sealing component 4 is located between the side wall portion 12 and the valve core component; the sealing component 40 includes the elastic pad 41 and the sealing member 42, the elastic pad 41 is fixedly connected to the sealing member 42, the elastic pad 41 is located between the sealing member 42 and the side wall portion 12 of the valve body component 10, the sealing member 42 is in contact with the valve core component 20, the acting force between the sealing member 42 and the valve core component includes sliding friction, and the acting force between the elastic pad 41 and the side wall portion 12 is static friction. The sealing member 42 may be made of Teflon, the sealing member 42 can be not only used for sealing, but also has a certain lubricating performance and is not easy to wear, which can reduce the friction between the valve core component and the sealing component, thereby reducing the driving force of the control valve.

Figure 2:
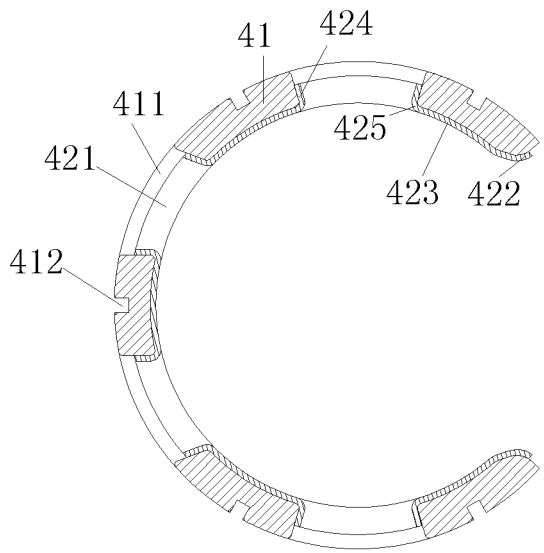
FIG. 2 is a schematic cross-sectional view of the sealing component shown in FIG. 1.

As shown in FIG. 1 and FIG. 2, the elastic pad 41 includes an outer peripheral wall portion 410, the elastic pad 41 has first through holes 411, first recessed grooves 412 and second recessed grooves 413, where the first through holes 411 extend through the outer peripheral wall portion 410 and the first through holes 411 are arranged in communication with the communication holes 101, and the first recessed groove 412 and the second recessed grooves 413 are recessed in the outer peripheral wall portion 410. Openings of the first recessed grooves 412 and the second recessed grooves 413 are arranged toward the side wall portion 12, each first recessed groove 412 may extend from one end of the elastic pad 41 to the other end of the elastic pad 41 in a longitudinal direction of the elastic pad 41, and multiple first recessed groove 412 are provided. In this embodiment, the first recessed groove 412 are distributed on two sides of the first through hole 411, and the first recessed groove 412 located between two adjacent first through holes 411 may be located in the middle of a portion located between the two adjacent first through holes 411. The first recessed grooves 412 may be arranged axially, the second recessed grooves 413 may be arranged circumferentially or in other form, and an expansion space for the elastic pad 41 can be formed by the second recessed grooves 413 when being compressed under force. In this embodiment, the second recessed grooves 413 are located on at least one side of the elastic pad 41 in the longitudinal direction of the elastic pad 41, and the first recessed grooves 412 are in communication with the second recessed grooves 413.

Figure 3:
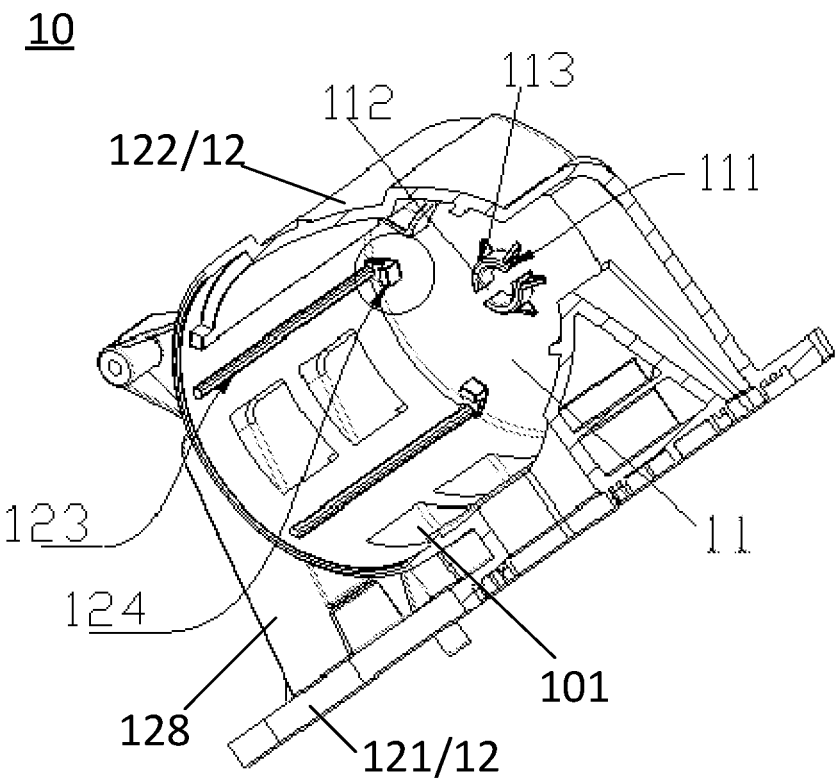
FIG. 3 is a schematic partially cross-sectional view of a valve body component of the control valve.

As shown in FIG. 3, the valve body component 10 includes protruding ribs 123 which protrude from the side wall portion 12. In this embodiment, the protruding ribs 123 protrude from the side wall portion 12 and are located in the valve cavity.

The number of the protruding ribs 123 corresponds to the number of the first recessed groove 412, each protruding rib 123 is inserted into the corresponding first recessed groove 412, and each protruding rib 123 is in interference fit, clearance fit or transition fit with the corresponding first recessed groove 412. The arrangement of the protruding ribs 123 and the first recessed grooves 412 can realize the positioning and mounting of the sealing component 4, so that the positions of the first through hole 411 and the second through hole 421 corresponds to the corresponding communication hole 101, respectively, to communicate the fluid. In addition, the fitting manner between the protruding ribs 123 and the first recessed grooves 412 can limit a position of the sealing component 4, and prevent the sealing component 4 from moving when the valve core component rotates. In this embodiment, a height of the protruding ribs 123 protruding from the side wall portion 12 is less than a depth of the first recessed grooves 412, so that a certain gap is formed between the protruding rib 123 and a bottom of the first recessed groove 412. In this way, the elastic pad 41 can abut against the second side wall 122, and an expansion space for the elastic deformation generated by the elastic pad can be formed by the gap formed between the protruding rib 123 and the bottom of the first recessed groove 412.

Figure 4:
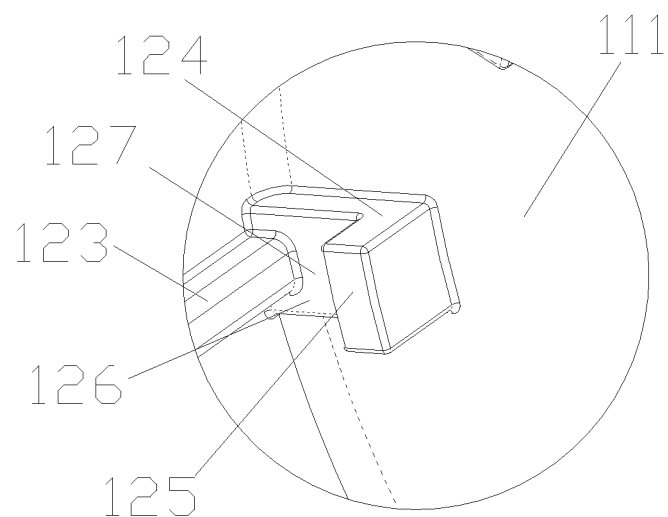
FIG. 4 is a schematic partially enlarged view of FIG. 3.
Figure 5:
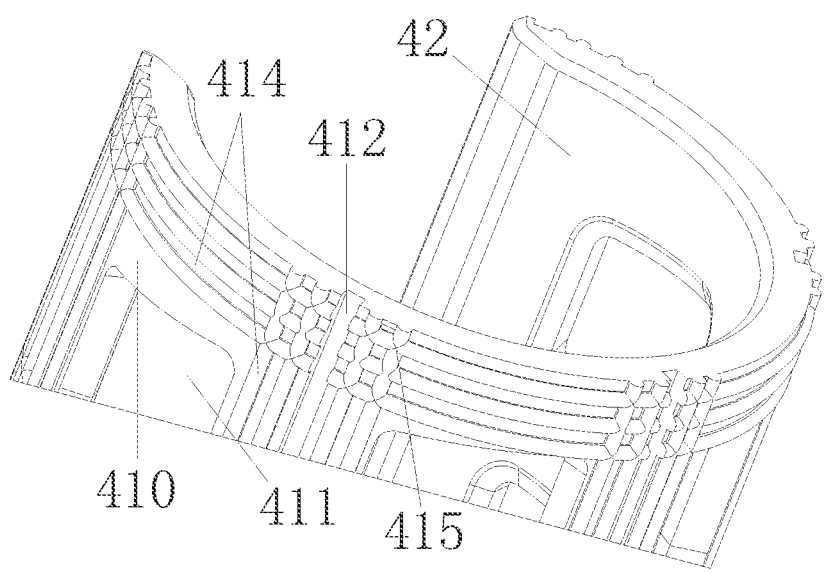
FIG. 5 is a schematic partially perspective view of the sealing component of the control valve according to another embodiment.
Figure 6:
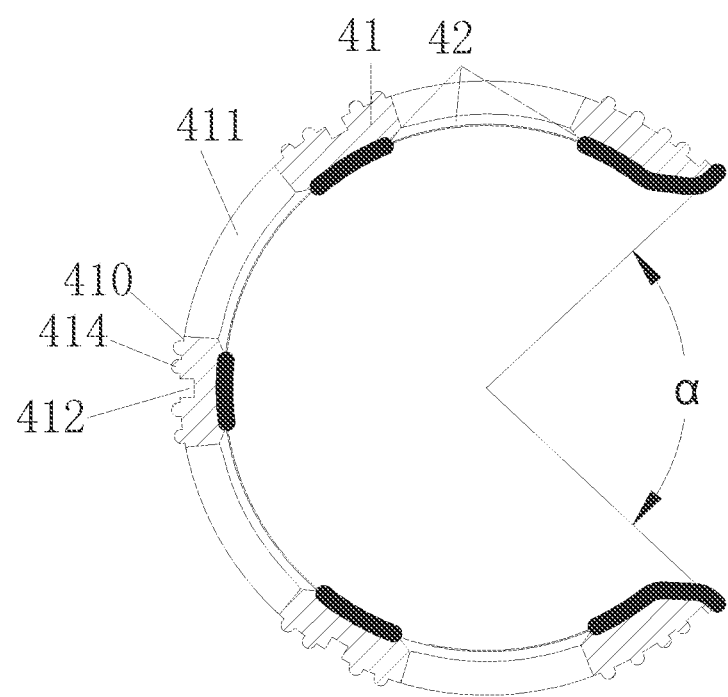
FIG. 6 is a schematic cross-sectional view of the sealing component shown in FIG. 5.

As shown in FIG. 3 to FIG. 4, the valve body component 10 further includes boss portions 124 which protrude from the bottom wall portion 11, each boss portion 124 includes a blocking portion 125 and a supporting portion 126, where the blocking portion 125 protrudes from the supporting portion 126 by a certain distance, at least part of the supporting portion 126 is located between the protruding rib 123 and the blocking portion 125. A position-limiting space 127 is formed between the blocking portion 125 and the protruding rib 123. After the sealing component 4 is assembled in the valve body component 10, one end of the sealing component 4 is accommodated in the position-limiting space 127, and the sealing component 4 abuts against the supporting portions 126. The arrangement of the boss portions 124 can limit a position of the end of the sealing component 4, and prevent the end of the sealing component 4 from being separated from the valve body component 10.

The side wall portion 12 includes a first side wall 121 and a second side wall 122, a distance from the first side wall 121 to a center axis of the valve cavity is greater than a distance from the second side wall 122 to the center axis of the valve cavity; the valve body component 10 is further provided with projections 128, which are arranged to protrude from the second side wall 122 in a direction away from the valve cavity. Each projection 128 is provided at a periphery of one of the communication holes 101 respectively, and at least two first through holes 101 are sleeved on one of the projections 128, respectively. For example, in FIG. 3, two first through holes 101 have a same position along a circumferential direction of the valve cavity, the two first through holes 101 are arranged along an axial direction of the valve cavity while being sleeved on one of the projections 128, respectively. The projections 128 have two flow passages, which are in one-to-one correspondence with and in communication with each of two first through holes 101.

As shown in FIG. 2, the sealing member 42 includes position-limiting portions 422, fitting portions 423, hemming portions 424 and connecting portions 425, the fitting portions 423 are in sliding fit with the valve core component, the two position-limiting portions 422 are located on two sides of the sealing member 42 in a circumferential direction of the sealing member 42, each position-limiting portion 422 has an outward protruding structure or an bending structure, which can further limit the position of the two sides of the elastic pad 41 to define the deformation range of the elastic pad 41 after extrusion, so that the positions of the second through holes 421 correspond to those of the first through holes 411. In this embodiment, a position-limiting manner by cooperation of the protruding ribs 123 and the first recessed grooves 412 is provided, the position-limiting portions 422 are located on two sides of the elastic pad 41, and a height of the position-limiting portions 422 is less than a thickness of the two sides of the elastic pad 41, and thus the expansion space for the elastic pad 41 can be formed.

A second through hole 421 is formed in the hemming portion 424, and at least part of the hemming portion 424 is inserted into the corresponding first through hole 411 and is fixed to an inner wall of the corresponding first through hole 411 by adhesion, so that the first through hole 411 is in communication with the corresponding second through hole 421. A height of the hemming portion 424 is less than a length of the first through hole 411, so that the sealing member 42 can be prevented from contacting the second side wall 122 when the elastic pad 41 is compressed, thus the elastic pad 41 can have more compression space. In addition, a part of the elastic pad 41 can be prevented from passing through the second through hole 421 and contacting the valve core component. If the elastic pad 41 is in contact with the valve core component, the friction of the rotation of the valve core component is increased, and the valve core component may be stuck due to the wear of the elastic pad 41.

In this embodiment, on one hand, the arrangement of the hemming portions 424 increases a contact area between the elastic pad 41 and the sealing member 42 and improves the adhesive force between the elastic pad 41 and the sealing member 42, on the other hand, the hemming portion 424 is inserted into the first through hole 411, which can limit the position of the sealing member 42 and the elastic pad 41, and prevent the sealing member 42 and the elastic pad 41 from being misplaced when the valve core component rotates.

The connecting portion 425 is located between the hemming portion 424 and the fitting portion 423, and the hemming portion 424 is rounding connected to the fitting portion 423 by the connecting portion 425. In this embodiment, a diameter of a connection part of the connecting portion 425 with the fitting portion 423 gradually increases in a direction toward the valve core component, and the connecting portion 425 can be used for buffering and guiding during the rotation of the valve core component, which also facilitates the rotation of the valve core component.

As shown in FIG. 3, the valve body component 10 further includes a matching portion 111 which protrudes from the bottom wall portion 11 and is located in the valve cavity, and the matching portion 111 includes notch portions 112 and rib plate portions 113. The arrangement of the notch portions 112 can discharge impurities in the coolant entering the matching portion 111 in time, so as to prevent the valve core component from being stuck. The arrangement of the rib plate portions 113 can improve the strength of the matching portion 111 and reduce the influence of the notch portions 112 on the strength of the matching portion 111. In addition, a height of the matching portion 111 is greater than or equal to a height of the boss portions 124, which can reduce the friction of the valve core component. In addition, the boss portion 124 can prevent the sealing component 4 from being separated from the valve body component 10 when the sealing component 4 is compressed and deformed.

As shown in FIGS. 3 to 6, FIG. 5 and FIG. 6 show another embodiment. In this embodiment, the elastic pad 41 further includes multiple protruding portions 414, the protruding portions 414 protrude from the outer peripheral wall portion 410, the protruding portions 414 surround the first through holes 411, and the protruding portions 414 abut against the side wall portion 12. In this embodiment, the protruding portions 414 include multiple axial protruding portions and multiple circumferential protruding portions, where the multiple axial protruding portions extend along an axial direction of the elastic pad 41, the multiple circumferential protruding portions extend along a circumferential direction of the elastic pad 41. Both the multiple axial protruding portions and the multiple circumferential protruding portions are distributed at a peripheral side of the first through holes 411, multiple axial protruding portions or multiple circumferential protruding portions are provided between any two adjacent first through holes, and at least one protruding portion is provided between the first through hole 411 and the first recessed groove 412. One end of the circumferential protruding portion intersects with one end of the axial protruding portion so as to form an intersecting portion 415, one end of the circumferential protruding portion intersects with ends of the multiple axial protruding portions so as to form multiple intersecting portions, and one end of the axial protruding portion intersects with ends of the multiple circumferential protruding portions so as to form multiple intersecting portions.

Multiple seals are formed by providing multiple protruding portions 414, which improve the sealing reliability. Meanwhile, the opening angle α becomes less after the sealing component 4 is assembled in the valve body component 10 than before the sealing component 4 is assembled in the valve body component 10. In that case, since a thickness of the elastic pad 41 is relatively large, and the elastic pad 41 has multiple first through holes 411, the deformation at different positions of the elastic pad 41 is uneven as the opening angle α is varied. Therefore, the sealing reliability is improved by providing multiple protruding portions 414, which is applicable to the sealing component with the variable opening angle α, thereby reducing the manufacturing difficulty of the sealing component 4. It should be noted that the shape of the sealing component 4 shown in the drawings is the shape of the sealing component 4 assembled into the valve body component, the shape of the sealing component 4 during assembly can vary, so that the opening angle α varies.

It should be noted that, in other embodiments, multiple sealing components 4 can be arranged axially or circumferentially, which can be arranged according to the requirement. The axial and circumferential directions are described with respect to that the sealing component 4 is assembled in the valve body component.

It should be noted that although the present application has been described herein in detail with reference to the above embodiments, those of ordinary skill in the art should understand that those skilled in the art may still modify or equivalently replace the present application, and all technical solutions and its improvements that do not apart from the spirit and scope of the present application should be covered by the scope of the claims of the present application.

The invention claimed is:

1. A control valve, comprising a valve body component and a valve core component, wherein the control valve has a valve cavity, at least most of the valve core component is located in the valve cavity; the valve body component comprises a side wall portion, the side wall portion is a peripheral wall or is at least a part of the peripheral wall of the valve cavity, the valve body component is provided with communication holes, wherein the control valve further comprises a sealing component, the sealing component is located between the side wall portion and the valve core component, the sealing component comprises an elastic pad and a sealing member, the elastic pad and the sealing member are in an integral structure, the elastic pad is located between the sealing member and the side wall portion of the valve body component, the elastic pad comprises an outer peripheral wall portion and protruding portions, the elastic pad has a plurality of first through holes and first recessed grooves, the protruding portions protrude from the outer peripheral wall portion, the first through holes extend through the outer peripheral wall portion, the first recessed grooves are recessed in the outer peripheral wall portion, the protruding portions surround the first through holes, the protruding portions abut against the side wall portion, the valve body component has protruding ribs which protrude from the side wall portion, and the protruding ribs are inserted into the first recessed grooves.

2. The control valve according to claim 1, wherein the protruding portion comprises a plurality of axial protruding portions and a plurality of circumferential protruding portions, the plurality of axial protruding portions or the plurality of circumferential protruding portions are provided between any two adjacent first through holes, at least one axial protruding portion is provided between the first through hole and the first recessed groove, and one end of the circumferential protruding portion intersects with one end of the axial protruding portion so as to form an intersecting portion.

3. The control valve according to claim 2, wherein one end of the circumferential protruding portion intersects with one end of each of the plurality of axial protruding portions to form a plurality of intersecting portions, and one end of the axial protruding portion intersects with one end of each of the plurality of circumferential protruding portions to form a plurality of intersecting portions.

4. The control valve according to claim 3, wherein the elastic pad is made of rubber material, the valve body component is made of aluminum material or plastic material by injection molding, the valve core component is made of plastic material by injection molding, the sealing member is made of Teflon, and the elastic pad is fixed to the sealing member by adhesion, and at least part of projections of the valve core component is arranged in contact with the sealing member of the valve body component.

5. The control valve according to claim 2, wherein the elastic pad is made of rubber material, the valve body component is made of aluminum material or plastic material by injection molding, the valve core component is made of plastic material by injection molding, the sealing member is made of Teflon, and the elastic pad is fixed to the sealing member by adhesion, and at least part of projections of the valve core component is arranged in contact with the sealing member of the valve body component.

6. The control valve according to claim 1, wherein each first recessed groove extends from one end of the elastic pad to the other end of the elastic pad in a longitudinal direction of the elastic pad, a plurality of first recessed grooves are provided, the first recessed grooves are distributed on two sides of the first through hole, a height of the protruding ribs protruding from the side wall portion is less than a depth of the first recessed grooves, and the protruding rib is in interference fit, clearance fit or transition fit with the corresponding first recessed groove.

7. The control valve according to claim 6, wherein the valve body component comprises a bottom wall portion and boss portions which protrude from the bottom wall portion, each boss portion comprises a blocking portion and a supporting portion, the blocking portion protrudes from the supporting portion by a distance, the supporting portion is located between the protruding rib and the bottom wall portion, the protruding rib is connected to the supporting portion, wherein a position-limiting space is formed between the blocking portion and the protruding rib, one end of the sealing component is accommodated in the position-limiting space, and the sealing component abuts against the supporting portion; wherein the valve body component further comprises a matching portion which protrudes from the bottom wall portion, the matching portion is matched with the valve core component, a part of the valve core component is inserted into the matching portion, the matching portion comprises notch portions and rib plate portions, and a height of the matching portion is greater than or equal to a height of the boss portions.

8. The control valve according to claim 7, wherein the elastic pad is made of rubber material, the valve body component is made of aluminum material or plastic material by injection molding, the valve core component is made of plastic material by injection molding, the sealing member is made of Teflon, and the elastic pad is fixed to the sealing member by adhesion, and at least part of projections of the valve core component is arranged in contact with the sealing member of the valve body component.

9. The control valve according to claim 6, wherein the side wall portion comprises a first side wall and a second side wall, a distance from the first side wall to a center axis of the valve cavity is greater than a distance from the second side wall to the center axis of the valve cavity; wherein the valve body component is further provided with at least two projections on the second side wall, each projection is provided at a periphery of one of the communication holes, respectively, and at least two first through holes are sleeved on one of the projections, respectively.

10. The control valve according to claim 9, wherein the elastic pad is made of rubber material, the valve body component is made of aluminum material or plastic material by injection molding, the valve core component is made of plastic material by injection molding, the sealing member is made of Teflon, and the elastic pad is fixed to the sealing member by adhesion, and at least part of projections of the valve core component is arranged in contact with the sealing member of the valve body component.

11. The control valve according to claim 6, wherein the elastic pad is made of rubber material, the valve body component is made of aluminum material or plastic material by injection molding, the valve core component is made of plastic material by injection molding, the sealing member is made of Teflon, and the elastic pad is fixed to the sealing member by adhesion, and at least part of projections of the valve core component is arranged in contact with the sealing member of the valve body component.

12. The control valve according to claim 1, wherein the sealing member is fixed to the elastic pad by adhesion, the sealing member comprises hemming portions and fitting portions, the fitting portions are arranged toward the valve core component, the fitting portions are in sliding fit with the valve core component, the sealing member further has second through holes, the first through holes and the second through holes correspond to the communication holes and are in communication with communication holes, respectively, wherein the second through hole is formed in the corresponding hemming portion, at least part of the hemming portion is inserted into the corresponding first through hole and is fixed to an inner wall of the corresponding first through hole by adhesion, and wherein a height of the hemming portions is less than a length of the first through holes.

13. The control valve according to claim 12, wherein the sealing member comprises at least two position-limiting portions located on two sides of the sealing member, each position-limiting portion has an outward protruding structure or an bending structure, the position-limiting portions are located on two sides of the elastic pad, and a height of the position-limiting portions is less than a thickness of the two sides of the elastic pad; wherein the sealing member further comprises connecting portions, the connecting portion is located between the hemming portion and the fitting portion, the hemming portion is rounding connected to the fitting portion by the connecting portion, and a diameter of a connection part of the connecting portion with the fitting portion gradually increases in a direction toward the valve core component.

14. The control valve according to claim 13, wherein the elastic pad is made of rubber material, the valve body component is made of aluminum material or plastic material by injection molding, the valve core component is made of plastic material by injection molding, the sealing member is made of Teflon, and the elastic pad is fixed to the sealing member by adhesion, and at least part of projections of the valve core component is arranged in contact with the sealing member of the valve body component.

15. The control valve according to claim 12, wherein the elastic pad is made of rubber material, the valve body component is made of aluminum material or plastic material by injection molding, the valve core component is made of plastic material by injection molding, the sealing member is made of Teflon, and the elastic pad is fixed to the sealing member by adhesion, and at least part of projections of the valve core component is arranged in contact with the sealing member of the valve body component.

16. The control valve according to claim 1, wherein the elastic pad is made of rubber material, the valve body component is made of aluminum material or plastic material by injection molding, the valve core component is made of plastic material by injection molding, the sealing member is made of Teflon, and the elastic pad is fixed to the sealing member by adhesion, and at least part of projections of the valve core component is arranged in contact with the sealing member of the valve body component.

17. The control valve according to claim 16, wherein the elastic pad has second recessed grooves, the second recessed grooves are arranged circumferentially, the second recessed grooves are located on an upper side and a lower side of the elastic pad, and the second recessed grooves located on the upper side and the lower side of the elastic pad are connected by the first recessed grooves.

* * * * *